United States Patent [19]

McCaslin et al.

[11] Patent Number: 4,828,371
[45] Date of Patent: May 9, 1989

[54] ANAMORPHIC LASER BEAM CORRECTION OPTICS

[75] Inventors: Martin J. McCaslin, Pleasanton; Jimmy D. Godwin, San Jose, both of Calif.

[73] Assignee: Xerox Corporation, Stamford, Conn.

[21] Appl. No.: 789,224

[22] Filed: Oct. 18, 1985

[51] Int. Cl.$^4$ .............................................. G02B 13/10
[52] U.S. Cl. ..................................... 350/421; 350/286
[58] Field of Search ................................ 350/286, 421

[56] References Cited

U.S. PATENT DOCUMENTS 3,871,750 3/1975 Mecklenborg ..................... 350/286

FOREIGN PATENT DOCUMENTS 8501119 3/1985 World Int. Prop. O. .......... 350/421

Primary Examiner—Deborah L. Kyle
Assistant Examiner—Richard W. Wendtland
Attorney, Agent, or Firm—Townsend and Townsend

[57] ABSTRACT

Correction of the ellipticity of a diode laser beam is achieved by an anamorphic beam expansion prism pair that are separated by an angularly rotationally adjustable mirror. The first prism of the prism pair is rotationally adjustable to various detent positions about a first axis and is translatable to various detent positions along a second axis, while the second prism has a fixed position. The first prism provides some beam expansion and the second prism provides the remainder of the beam expansion. The amount of beam expansion by the first prism is varied by adjustment of its rotation and translation, yet the expanded beam from the first prism exhibits zero positional offset at the location of the rotatable mirror. The mirror is rotated such that the optical axis between the mirror and the second prism is the same for all cases of beam expansion.

2 Claims, 2 Drawing Sheets

FIG. 1 (PRIOR ART)
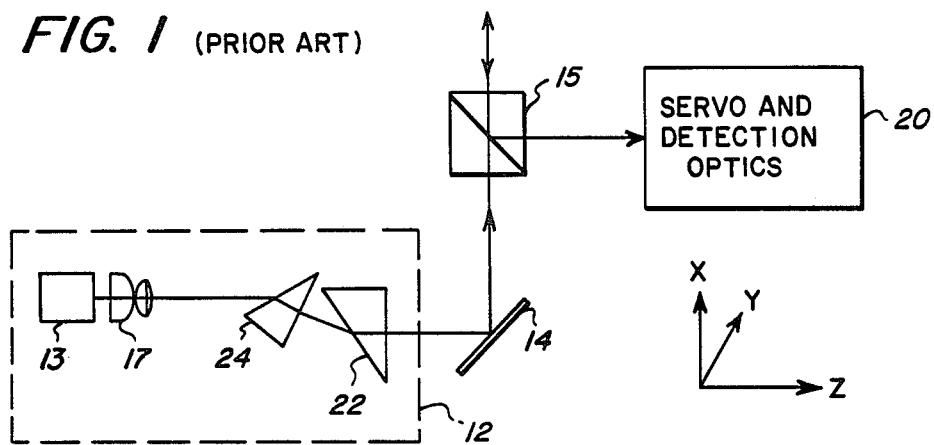
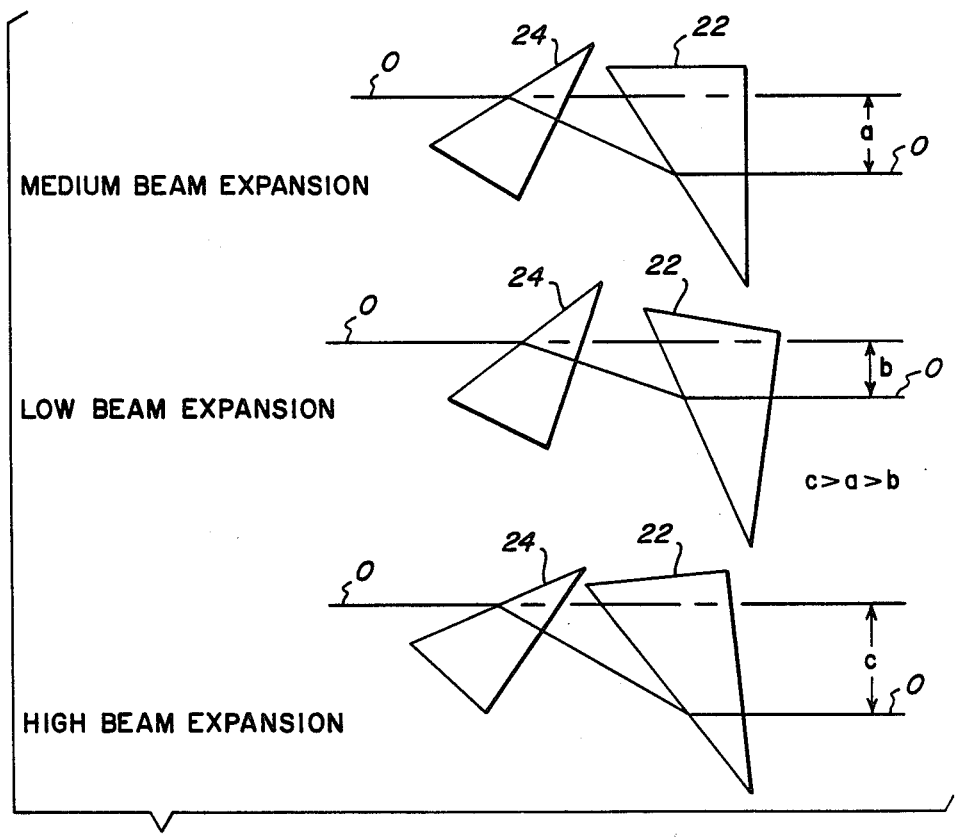
FIG. 2 (PRIOR ART)

ANAMORPHIC LASER BEAM CORRECTION OPTICS

The optics module of commercially available optical disc drives are typically designed to have collimated light enter the objective lens of the drive. This makes the distance from the collimating lens to the objective lens non-critical. The objective lens can dynamically focus on a non-flat spinning disk without concern for changing the back conjugate and thus the optical performance of the drive.

Beam collimation is easily achieved in conventional laser systems using gas or ion lasers by monitoring divergence based on a gaussian intensity pattern. The beam from a diode laser, however, has a non-gaussian intensity pattern. Wavefronts in the axes orthogonal to the optical axis have different angles of divergence, such that an elliptical light beam is provided upon collimation. Both axes of the elliptical beam must be evaluated because each plays a specific role in the overall optic design. Divergence angles also vary from laser diode to laser diode which further complicates matters.

To correct for the beam ellipticity, conventional optics modules for optical disk drives include anamorphic optics located beyond the collimating lens. The anamorphic optics expand the magnitude of the smaller beam wavefront thereby providing a beam with a circular wavefront. Conventional anamorphic optics are commonly comprised of a pair of adjacent, close proximity prisms with antireflection coatings. To accommodate for correction of beam ellipticity for different diode lasers, both of the prisms are mounted for rotation relative to the laser, but in opposing directions.

FIG. 1 illustrates a prior art application of variable anamorphic beam expansion in an optical module of a conventional optical disk drive. The optical module would include a laser/prism pair assembly 12, a routing mirror 14, and a beam splitter 15 which transmits laser light to an optical disc 16 via an objective lens arrangement 18 and directs reflected light out of the transmission path to data and servo detectionoptics 20. The laser/prism pair assembly 12 would include a diode laser 13 with appropriate orientation, a collimating lens arrangement 17 and anamorphic beam expansion optics shown as prisms 22 and 24. To correct for beam ellipticity for the particular diode laser 15 being used, the prisms 22 and 24 of the prism pair 22/24 are rotatably mounted relative to the laser axis, with more relative rotation required as the ellipticity of the laser beam increases, that is, more relative rotation as a greater amount of beam expansion is required. FIG. 2 illustrates how the optical axis of FIG. 1 is dependent upon the light incidence angles of the prism pair corresponding to medium, low and high amounts of beam expansion. The optical axis 'O' is displaced a distance "a" for medium beam expansion, with that displacement of the axis 'O' decreasing to distance "b" for low beam expansion and increasing to distance "c" for high beam expansion. The offset of the optical axis corresponding to different beam expansions is taken care of by 'x' axis translation of the assembly 12 in order to get the optical axis 'O' in line with the rest of the system including beam splitter 15 and objective lens arrangement 18.

The primary disadvantage of the prior art system is that of having to provide and leave space in the disc drive for the 'x' axis adjustment of the assembly 12 required to remedy the offset of the optical axis. An adjustment range of +2.5 mm is needed in some cases, which results in a large volume sweep. Also, mechanics providing for such an adjustment range tend to be dynamically and thermally unstable.

SUMMARY OF THE INVENTION

Correction of the ellipticity of a diode laser beam is achieved by an anamorphic beam expansion prism pair that are separated by an angularly rotationally adjustable mirror. The first prism of the prism pair is rotationally adjustable to various detent positions about a first axis and is translatable to various detent positions along a second axis, while the second prism has a fixed position. The first prism provides some beam expansion and the second prism provides the remainder of the beam expansion. The amount of beam expansion by the first prism is varied by adjustment of its rotation and translation, yet the expanded beam from the first prism exhibits zero positional offset at the location of the rotatable mirror. The mirror is rotated such that the optical axis between the mirror and the second prism is the same for all cases of beam expansion. This split prism arrangement minimizes and may eliminate the 'x' axis displacement adjustment of the laser prism assembly which greatly reduces its sweep volume interior to the disc drive.

BRIEF DESCRIPTION OF THE DRAWINGS

FIG. 1 is a schematic diagram of a prior art optical recording system utilizing anamorphic beam expansion.

FIG. 2 shows, in detail, operation of a component of FIG. 1.

DETAILED DESCRIPTION OF THE INVENTION

Figure 3:
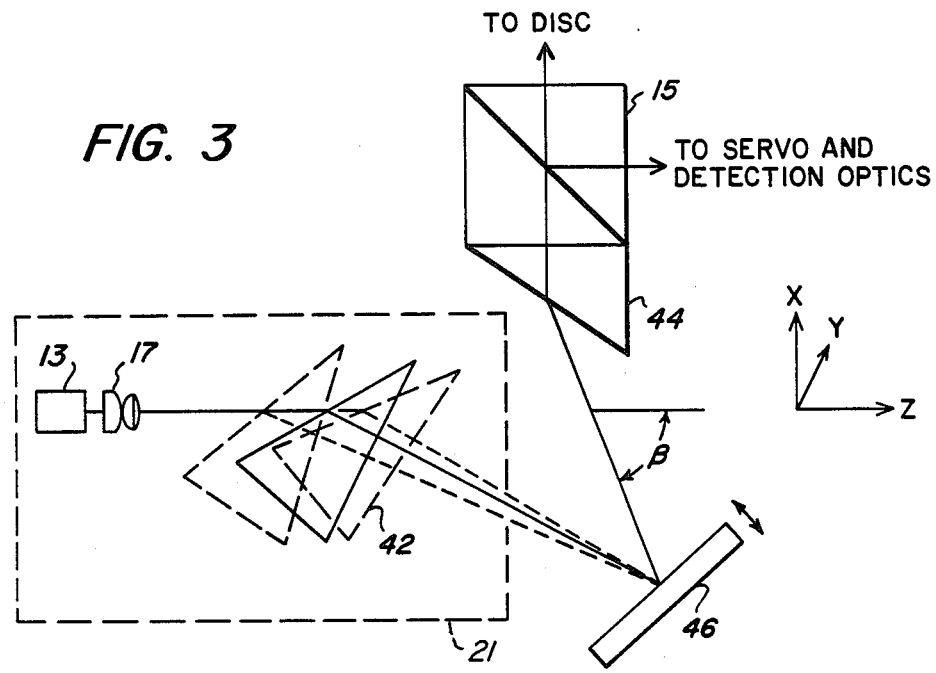
FIG. 3 is a schematic diagram of an optical recording system utilizing anamorphic beam expansion in accordance with the invention.
Figure 4:
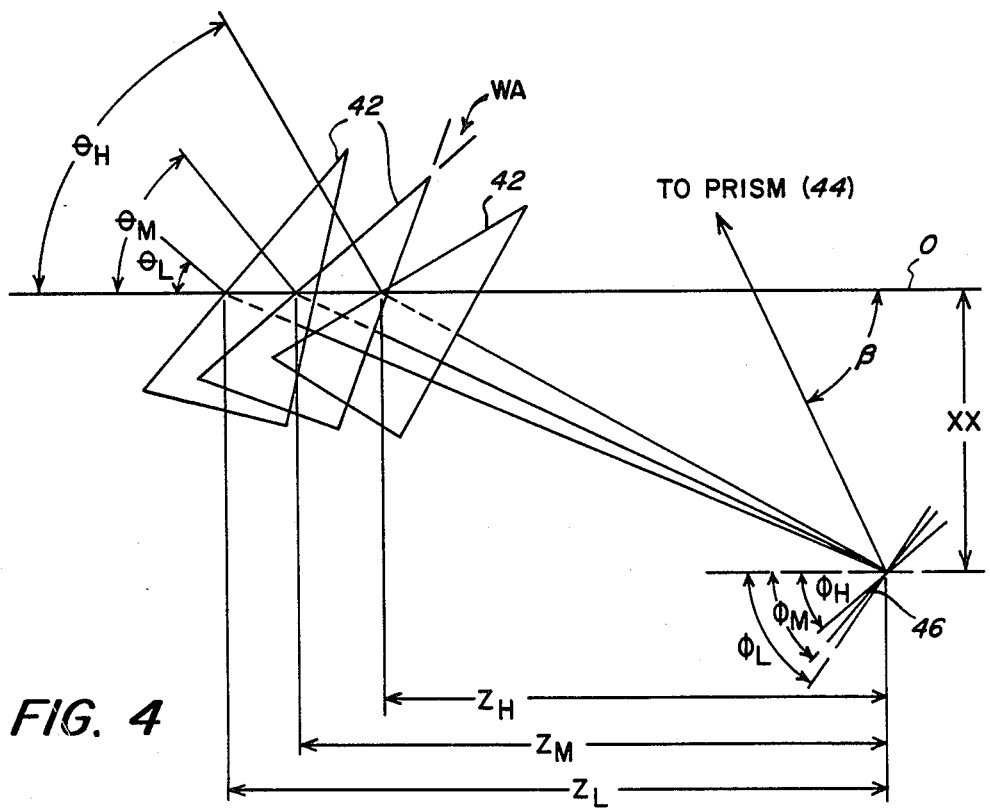
FIG. 4 shows, in detail, operation of a portion of the anamorphic beam expansion assembly utilized in FIG. 3.

Referring to FIGS. 3 and 4 there is illustrated an optical system according to the invention, with parts corresponding to like parts of FIG. 1 having the same reference numerals. According to the invention, the prisms 42 and 44 of the anamorphic beam expanding prism pair 42/44 are separated by an angularly rotationally adjustable mirror 46. The first prism 42 of the prism pair is rotationally adjustable to various detent positions about the "y" axis (axis perpendicular to plane of drawing) and is translatable to various detent positions along the "z" axis, as depicted by the three positions of prism 42 in of FIG. 3. Although FIGS. 3 and 4 show three detent positions for prism 42, there could be more, or even infinite adjustability (smooth continous adjustability). With a three detent strategy, for example, it may be desirable to have a dedicated mechanical housing for the laser/prism 42 assembly 21, having the corresponding angular and positional features for mounting prism 42 built-in. In this case, there would be a low, medium and high version of the housing that could be paired up with appropriate laser diodes prior to assembly. Clearly, three sets of prism 42 locational features on one common housing would be acceptable. To accommodate infinite or smooth continuous adjustability, a conventional mechanism is used to achieve the desired rotation and translation of prism 42, such a mechanism comprised, for example, of a plate having a linear degree of freedom in the Z axis, which carries the prism 42 on a submount having a rotational degree of freedom in the Y axis. The plate and submount are secured to the main laser/prism housing via fasteners or adhesives.

The second prism 44 of the prism pair 42/44 has a fixed position between the adjustable mirror 46 and the beam splitter 15 and can be attached directly to a face of the beam splitter 15 as is shown in FIG. 3. The mirror 46 is rotated for each position of prism 42 such that the optical axis between mirror 46 and second prism 44 (that is, angle B) is the same for all rotations/translations of prism 42. Prism 42 provides some beam expansion and prism 44 provides the remainder of the beam expansion.

FIG. 4 illustrates in how prism 42 is both rotated and translated to provide variable beam expansion per the requirements of the specific laser diode 13 being used. When medium beam expansion is required by prism 42, prism 42 would occupy the center position shown in FIG. 4 and its hypotenuse face would have an angle $\theta_M$ with the incident beam from laser diode 13. For less than medium beam expansion, that is, low beam expansion, the prism 42 is translated to the left of the medium beam expansion position, that is, closer to laser diode 13, and rotated counterclockwise, such that the incidence angle decreases to $\theta_L$. For more than medium beam expansion, that is, high beam expansion, the prism 42 is translated to the right of the medium beam expansion position, that is, further from the laser diode 13 and rotated clockwise such that the incidence angle increases to $\theta_H$. All three positions of prism 42 exhibit zero positional offset at the location of mirror 46, that is, for all positions of prism 42 the partially expanded beam strikes the mirror 46 at a common point. Mirror 46 is rotated to permit the partially expanded beam to intersect the mirror plane at different angles for the three positions of prism 42, with the angle of intersection being smallest for high beam expansion and largest for low beam expansion, as shown in FIG. 4. In summary, as the incidence angle $\theta$ to the prism 42 increases (more beam expansion) both the spacing along the axis "Z" from the incidence point of the beam with the hypotenuse face of the prism 42 to the mirror 46, and the mirror 46 angular position decrease. Such translational and rotational positioning of prism 42 and rotation of mirror 46 permit the optical axis between mirror 46 and second prism 44 to be the same for all amounts of beam expansion. The theoretical geometric relationships between the optical elements 42 and 46 are easily computed using Snell's Law and trigonometry.

By way of example, and referring again to FIG. 4, if the beam expansion requirements are 1.35, 1.66 and 1.99 (low, medium, high), if the prism 42 has a glass index of 1.571 and a wedge angle WA of 32.45 degrees, if mirror 46 has a rotation axis displacement XX of 8.78 mm, and if the reflected beam angle B is desired to be 68 degrees, for medium beam expansion, the angle would be 59.8 degrees, the mirror angle $\phi_M$ would be 43 degrees and the distance $Z_M$ would be 18.0 mm; for low beam expansion, the angle $\phi_L$ would be 49.62 degrees, the mirror angle $\phi_L$ would be 44.7 degrees and the distance $Z_L$ would be 21.45 mm; for high beam expansion, the angle $\theta_H$ would be 65.85 degrees, the mirror angle $_H$ would be 41.7 degrees and the distance $Z_H$ would be 15.86 mm.

It is advantageous to minimize the number and range of alignments in an optic system. The disclosed prism rotation and translation concept minimizes and may eliminate the "X" axis adjustment of the laser prism assembly which greatly reduces its sweep volume interior to the disc drive. The rotation of the mirror 46 is not an added step in the alignment process because it is necessary anyway for getting the beam true to the entrance of the objective lens and/or the travel of the split (moving) optics. In this concept it becomes dual purpose. Thus, the transmission leg of the optics provides a light source, which can be corrected for lasers of different beam divergence while having an output axis constant in direction and position for all such divergences.

What is claimed is:

1. A method of correcting any ellipticity of an optical beam provided by a light source, said method comprising the steps of:

directing the beam through a correction optics system having a first prism for providing partial beam expansion, a second prism for providing the remaining beam expansion required to correct the ellipticity and a mirror interposed between the first and second prisms;

rotating the first prism about a first axis normal to the axis of the optical beam to partially expand the beam;

translating the first prism along a second axis parallel to the axis of the optical beam so that the partially expanded beam strikes the mirror at a common point; and rotating the mirror about the first axis so that the partially expanded beam is directed to the second prism along an optical path which is constant in direction and position.

2. In an optical system utilizing an optical beam provided by a light source, apparatus for correcting any ellipticity of the optical beam, said apparatus comprising;

a first prism mounted for translation along a first axis parallel to the axis of said optical beam and for rotation about a second axis normal to said first axis, said first prism providing partial beam expansion for said optical beam;

a second prism for providing the remaining beam expansion for said optical beam required to correct said ellipticity of said optical beam; and a mirror rotatably positioned between said first and second prisms to receive the partially expanded beam from said first prism at a common point on the mirror for each translational and rotational position of said first prism and to direct the partially expanded beam received from said first prism to said second prism along an optical path which is constant in direction and position.

* * * * *